(12) United States Patent
Hsu

(10) Patent No.: US 11,118,504 B2
(45) Date of Patent: Sep. 14, 2021

(54) EXPANDED TORQUE SYSTEM OF INTERNAL COMBUSTION ENGINE

(71) Applicant: Tsung-Yung Hsu, Taichung (TW)

(72) Inventor: Tsung-Yung Hsu, Taichung (TW)

(*) Notice: Subject to any disclaimer, the term of this patent is extended or adjusted under 35 U.S.C. 154(b) by 120 days.

(21) Appl. No.: 16/745,652

(22) Filed: Jan. 17, 2020

(65) Prior Publication Data

US 2020/0240325 A1 Jul. 30, 2020

(30) Foreign Application Priority Data

Jan. 24, 2019 (TW) .................. 108102729

(51) Int. Cl.
| | | |
|---|---|---|
| *F02B 75/04* | (2006.01) | |
| *F02D 15/02* | (2006.01) | |
| *F01B 9/02* | (2006.01) | |
| *F02B 41/04* | (2006.01) | |
| *F02B 75/02* | (2006.01) | |
| *F02B 75/32* | (2006.01) | |

(52) U.S. Cl.
CPC .......... *F02B 75/048* (2013.01); *F02B 75/045* (2013.01); *F01B 9/02* (2013.01); *F02B 41/04* (2013.01); *F02B 75/32* (2013.01); *F02B 2075/027* (2013.01); *F02D 15/02* (2013.01); *F16C 2360/22* (2013.01)

(58) Field of Classification Search
CPC ...... F02B 75/048; F02B 41/04; F02B 75/045; F02B 75/32; F02B 75/04; F01B 9/026; F01B 9/02; F01B 9/00; F02D 15/02; F16C 5/00; F16C 7/00; F16C 7/06; F16C 9/00; F16C 9/04

USPC ........................................... 123/48 B
See application file for complete search history.

(56) References Cited

U.S. PATENT DOCUMENTS

| | | | | |
|---|---|---|---|---|
| 4,974,554 A | * | 12/1990 | Emery | .................... F02B 41/04 123/197.3 |
| 2011/0226220 A1 | * | 9/2011 | Wilkins | ..................... F16J 7/00 123/48 B |
| 2013/0312550 A1 | * | 11/2013 | Inden | ...................... F02B 75/32 74/43 |
| 2017/0002733 A1 | * | 1/2017 | Pettinger | ................. F16C 7/023 |
| 2018/0328274 A1 | * | 11/2018 | Dury | ......................... F16C 7/04 |

* cited by examiner

*Primary Examiner* — Lindsay M Low
*Assistant Examiner* — Omar Morales (57) ABSTRACT

An expanded torque system of an internal combustion engine includes a cylinder having an upper piston bore, a lower piston bore and a lower action chamber. An upper piston is connected to the upper link rod and reciprocally moves in the upper piston bore. A linkage unit has a link block coupled to the upper link rod. A lower piston moves in the lower piston bore and is connected to the link block. A lower link rod is disposed at the lower action chamber and is pivotally coupled between the linkage unit and a lower link rod pivoting handle. A crank shaft is disposed at the lower action chamber and has a main shaft and the lower link rod pivoting handle eccentrically connected to the main shaft. An oil ring with oil outlets is disposed at the top of the lower action chamber and communicates with a main oil duct.

9 Claims, 9 Drawing Sheets

EXPANDED TORQUE SYSTEM OF INTERNAL COMBUSTION ENGINE

FIELD OF INVENTION

The present invention relates to internal combustion engines, in particular to a four-stroke internal combustion engine system.

BACKGROUND OF INVENTION

Description of the Related Art

Since the invention of reciprocating internal combustion engines, the fuel efficiency has continued to improve constantly and the engines have become more and more fuel efficient. In recent decades, relevant technologies to improve the fuel efficiency from carburetors, injection in intake pipes, and direct injection in cylinders to the recently tested self-ignition in gasoline engine cylinders can be said to focus on combustion chambers and their upstream technological innovation.

It is known from the basic principle of mechanics that an increased length of an arm of force will give a larger torque in a rotary motion if the applied force remains constant. However, if the arm of force is lengthened in the conventional reciprocating system, then a direct relation will exist between the cylinder bore and the length of the arm of force length (wherein twice of the length is the piston stroke) in the condition of a constant displacement. In other words, an increased arm of force provides a greater torque, and the cylinder bore increases with the increased stroke, and thus giving a greater displacement, and consuming more fuel.

A research report on stroke-bore (SB) ratio provided by Z. S. Filipi and D. N. Assanis indicates that a long-stroke engine can provide a higher heat efficiency by faster combustion and lower overall chamber heat loss when the displacement is kept constant ("The effect of the stroke-to-bore ratio on combustion, heat transfer and efficiency of a homogeneous charge spark ignition engine of given displacement", International Journal of Engine Research 1(2): 191-208, April 2000).

According to the research data provided by Z. S. Filipi and D. N. Assanis, if the S/B ratio of a 400 cc engine is 1.3 (wherein the length of arm of force is increased by 0.52 times), the cylinder bore will be decreased from the original 90 mm to 73 mm, and the length of the link rod will be increased to 191 mm, and so on so forth. If the S/B ratio is increased to 1.97 (wherein the length of arm of force length is doubled), the cylinder bore will be reduced to 63.7 mm (wherein the diameter of the air inlet and outlet will be smaller than 26 mm), and the length of the link rod will be greater than 250 mm. Therefore, the internal combustion engine will have the following problems:

1. Since the diameter of the air inlet is small, so that the intake air is insufficient for a high-speed operation of the engine.
2. Due to the limitation of the cylinder bore, the link rod will have a width smaller than 18 mm and a length greater than 250 mm. As a result, the link rod is unable to withstand a high torque, and the life of the engine will be affected.
3. Since the length of the link rod is too large, the oil will be sprayed upwardly onto the cylinder wall, and the lubrication effect of the cylinder will be poor.

To achieve a better heat efficiency of the long-stroke design and avoid the aforementioned drawbacks caused by the increased S/B ratio, the inventor of the present invention focused on the parts under the combustion chamber to conduct extensive research and experiment for the structural change and innovation of the design, and finally developed an internal combustion engine capable of improving the horsepower significantly in the condition of the same oil consumption, reducing the oil consumption in the condition of the same horsepower output, and achieving the effects of overcoming the drawbacks of the prior art, and providing a smooth and stable long-term operation.

SUMMARY OF THE INVENTION

To achieve the aforementioned and other objectives, the present invention provides an expanded torque system of an internal combustion engine, comprising: a cylinder having an upper piston bore, a lower piston bore and a lower action chamber. An upper piston reciprocally moves in the upper piston bore. An upper link rod with an end is coupled to the upper piston. A linkage unit comprises a link block coupled to the other end of the upper link rod, and a lower piston moving in the lower piston bore and coupled to the link block. A lower link rod is disposed at the lower action chamber and has an end pivotally coupled to the linkage unit. A crank shaft is disposed at the lower action chamber and comprises a main shaft and a lower link rod pivoting handle eccentrically coupled to the main shaft. The other end of the lower link rod is pivotally coupled to the lower link rod pivoting handle; and an oil ring, disposed at the top of the lower action chamber and communicates with a main oil duct and surrounds the upper link rod. The oil ring has a plurality of oil outlets.

With the installation of the linkage unit and the lower link rod, the lower link rod can increase the arm of force for the rotation of the crank shaft to improve the horsepower and torque outputted by the crank shaft, or can reduce the rotation speed of the internal combustion engine while maintaining the original horsepower output, so as to achieve the effect of saving power.

This invention also provides another expanded torque system of an internal combustion engine and comprises a cylinder having an upper piston bore, a lower piston bore and a lower action chamber. An upper piston reciprocally moves in the upper piston bore. An upper link rod with an end coupled to the upper piston. A linkage unit comprises a link block coupled to the other end of the upper link rod. A lower piston moves in the lower piston bore and is coupled to the link block. A lower link rod is disposed at the lower action chamber and has an end pivotally coupled to the linkage unit. A crank shaft is disposed at the lower action chamber and comprises a main shaft and a lower link rod pivoting handle eccentrically coupled to the main shaft. The other end of the lower link rod is pivotally coupled to the lower link rod pivoting handle. An oil ring is disposed at the top of the lower action chamber and surrounds the upper link rod. The oil ring has a plurality of oil outlets. A pump communicates with the oil ring. A control circuit is coupled to the pump via a signal. A temporary oil storage tank communicates with the pump. The temporary oil storage tank is serially connected with a main oil duct. The temporary oil storage tank has a level sensor linked with the control circuit for turning on and off the level sensor.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

With reference to FIGS. 1 to 7, 12, and 13 for an expanded torque system of an internal combustion engine in accordance with a preferred embodiment of the present invention, the expanded torque system of an internal combustion engine comprises: a cylinder (1) having an upper piston bore (11), a lower piston bore (21) and a lower action chamber (22). An upper piston (30) sealedly and reciprocally moves in the upper piston bore (11). An upper link rod (40) with an end coupled to the upper piston (30). A linkage unit (50) includes a link block (51) coupled to the other end of the upper link rod (40), and a lower piston (52) moving in the lower piston bore (21) and coupled to the link block (51). A lower link rod (60) is disposed at the lower action chamber (22) and has an end pivotally coupled to the linkage unit (50). A crank shaft (70) is disposed at the lower action chamber (22) and has a main shaft (71) and a lower link rod pivoting handle (72) eccentrically coupled to the main shaft (71). The other end of the lower link rod (60) is pivotally coupled to the lower link rod pivoting handle (72). An oil ring (80) is disposed at the top of the lower action chamber (22) and communicates with a main oil duct, and surrounds the upper link rod (40). The oil ring (80) has a plurality of oil outlets (82).

Figure 1:
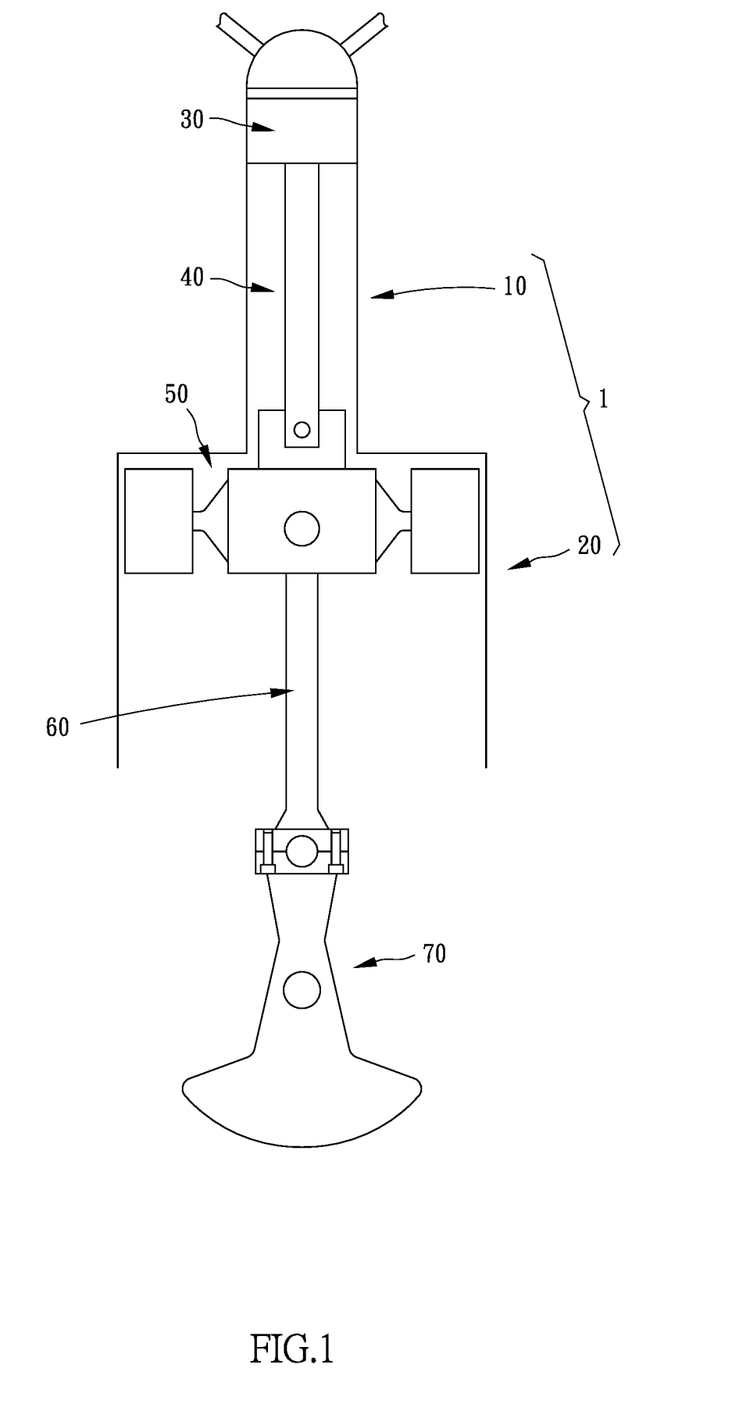
FIG. 1 is a cross-sectional view of a preferred embodiment of the present invention.
Figure 12:
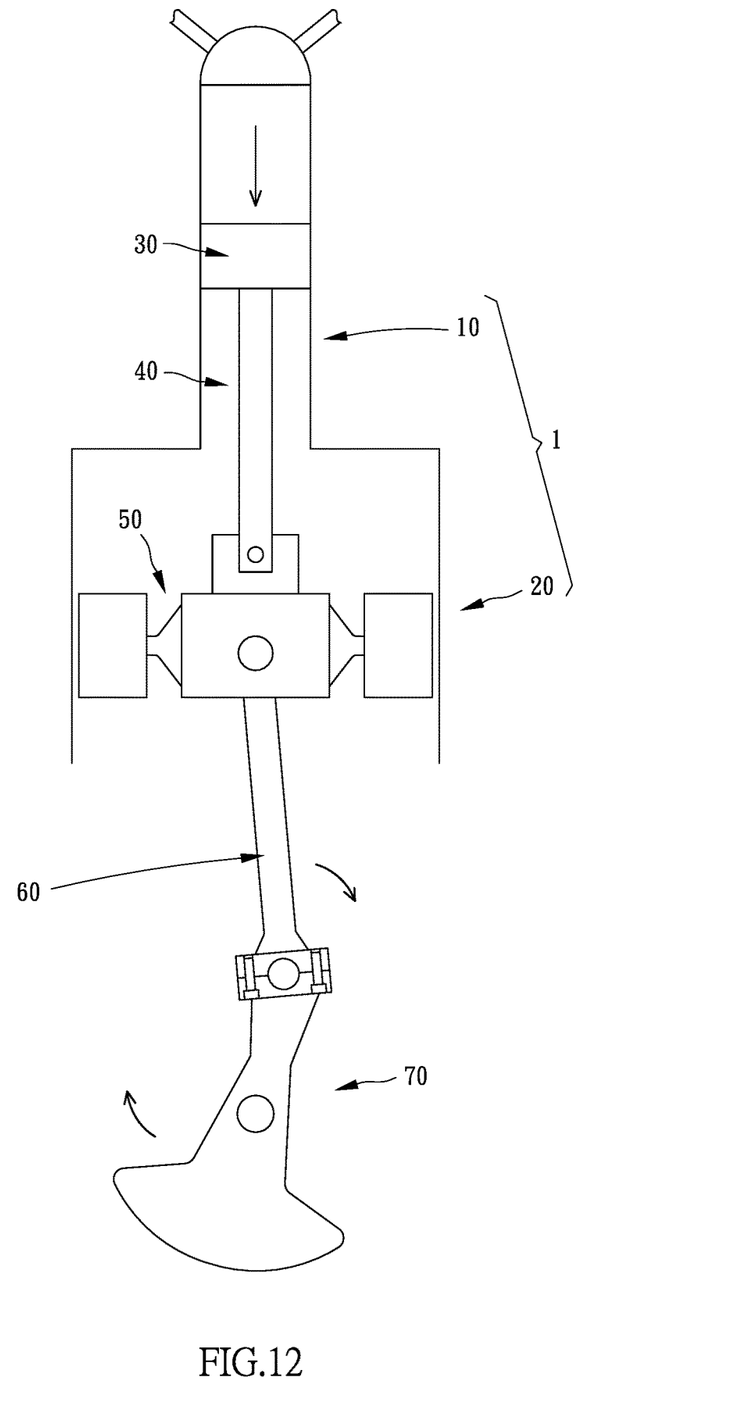
FIG. 12 is a schematic view showing an action of FIG. 1.
Figure 13:
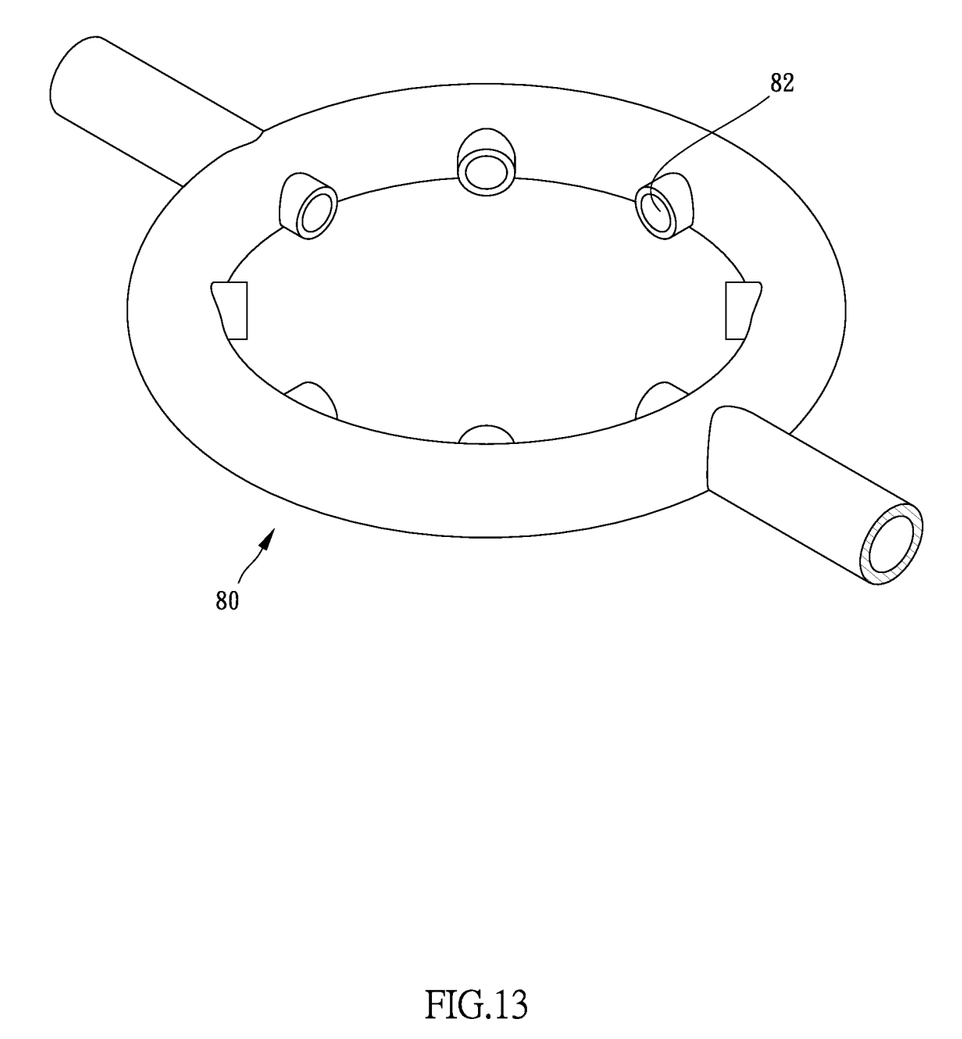
FIG. 13 is a perspective view of an oil ring of the present invention.

By the aforementioned structure, the present invention can increase the length of the upper link rod (40) and the lower link rod (60) to increase the length (L1) of the arm of force for the rotation of the crank shaft (70) while maintaining the cross-sectional area of the upper piston (30) to be the same as that of the piston of the traditional system.

In the expanded torque system of an internal combustion engine of the present invention, the direct injection of fuel cylinders and the delayed closing of air inlets are a prior art and have the same air-to-fuel mixing ratio, pressure and volume as those of the conventional systems in a combustion chamber, so that the fuel explosion is the same as that of the conventional system. Under the conditions of having the same cross-sectional area of the upper piston (30) and neglecting the friction between the lower piston (52) and the bore wall of the lower piston bore (21), the present invention has a greater length (L1) of the arm of force than that of the conventional system, the produced torque is greater than that of the conventional system, so as to increase the output of horsepower.

In the method above, the piston stroke becomes n times of the original length, so that the torque is increased by n times, and the braking horsepower is also increased by n times of the original horsepower (in other words, the horsepower becomes larger). To maintain the original output of horsepower, the rotation speed must be decreased accordingly, so that the effect of saving power can be achieved.

Assume that n=2, this value is used to carry out a trial calculation of the energy efficiency of a vehicle engine, and the internal combustion engine is a four-cylinder four-stroke car engine with a braking horsepower of 140 hp, a stroke of 90 mm, and a piston diameter of 88 mm. The structural design of the present invention uses an upper piston (30) with diameter of 88 mm, and a stroke of 180 mm instead.

In the estimation of frictional horsepower, the book "Gasoline-engine Management" (written by Robert Bosch Gmbh, "Gasoline-engine Management", 3 Jun. 2006, P. 27) indicates that the frictional loss in an engine and its accessories is about 10% of the horsepower outputted by the engine). According to the book "Theory and Technology of Gasoline-engine (written by Tsai, Hsin-cheng, "Theory and Technology of Gasoline-engine" Chuan Hwa Book Co., 1999, First Edition, p 2-2'7), the frictional loss of a piston ring and the frictional loss of a piston body are about 50~60% of the pure mechanical frictional loss. The median 55% is used for calculation. The frictional loss of the piston of the original 140 hp engine (including the frictional loss of both of the piston ring and the piston) is approximately 7.7 hp. In the new-structured engine with n=2, the frictional loss of the upper piston (30) is also increased to 7.7 hp since the stroke is doubled. With the special design of the shapes of the lower piston (52) and its link block (51), the diameters of both left and right lower piston (52) are smaller than the diameter of the upper piston (30), so that we may let the diameter of the piston ring of the lower piston (52) is ½ of that of the upper piston, and the total frictional loss of the piston rings of both left and right lower pistons (52) and the piston is the same as that of the upper piston (30) and equal to (7.7/2)×2×2=15.4 (hp). Therefore, the total frictional loss of the pistons of the new-structured engine is equal to 15.4+7.7×2=30.8 (hp).

In the estimation of engine efficiency, assume that the frictional change is constant, the frictional loss of the lower piston (52) of the new structural design is increased by 30.8−7.7=23.1 (hp). Due to some of the additions or changes to the new structural design of the lubrication system including the upper link rod (40), the lower link rod pivoting portion (55) and the upper piston bore (11), we suppose that the frictional horsepower is increased by 3 hp. If n=2, the braking horsepower will be increased by 140×(2−1)=140 hp, so that the net increase of horsepower is equal to 253.9 hp (140+140−23.1−3), and the net engine output efficiency is improved by 253.9/140=181.4%. Now, if we want to maintain the engine at an output efficiency of 140 hp, the rotating speed of the engine must be reduced to the original 140/253.9=55.1%. If the limitation of the material of the cylinder and the piston is not taken into account and n=2, then the fuel consumption can be saved by 100−55.2=49.1(%).

If the total stroke of the piston per minute is used as an indicator of the material of the cylinder wall and the piston, and the rotating speed is reduced to 55.1% of the original rotating speed, then the total stroke of the piston per minute will be 1.102 times of the original output horsepower 140 hp (which is equal to n×0.551, and n=2). This shows that if the cylinder wall and the piston are made of the same material, n=2 and the rotating speed is 55.1% of the original speed, the actual output horsepower will be slightly smaller than 140 hp. When n=2, the total stroke of the piston is the same, the maximum rotating speed limit is ½ (which is 50%) of the original speed, which is 5.1% different from the foregoing estimated value 55.1%, so that the actual fuel saving efficiency should be 44.9−5.1=39.8(%) in order to achieve a horsepower of 140 hp.

However, the fuel saving efficiency of the engine at a low rotating speed range will be better than expected due to the increase of the torque in the actual operation of the engine, and the total fuel saving efficiency will fall within a range of 39.8%~44.9%.

In the exploration of a reasonable range of the multiple of torque expansion n, $P=2\pi\tau N$, and $\tau=Fd$, where N is the rotating speed, $\tau$ is the torque, d is the length of the arm of force (which equals to ½ of the piston stroke), and the equations above show that if d is increased by n times, then P will be increased by n times provided that F is constant. However, it is impossible for the value n to have no upper limit in practical applications for the following reasons.

1. The material and design of components affects the load capacity and durability of the internal combustion engine. The material of components and their design have a substantial effect on the service life of the internal combustion engine. For example, when the cylinder wall and the piston are made of the same material, and calculated by the same method, the corresponding data of the stroke expansion multiple and the power saving efficiency are listed in the following tables:

| | | Limitation of material not taken into account | | | |
|---|---|---|---|---|---|
| Multiple of torque (n) | Fuel saving efficiency (a %) | Ratio of Rotating speed to Original Rotating speed for the same Output horsepower (c %) | Rotating speed ratio d % of same output horsepower, and same total piston stroke (1/n) | c-d % | Fuel saving efficiency of same material a-(c-d) % |
| 1.5 | 26.9 | 73.1 | 66.7 | 6.4 | 20.5 |
| 1.8 | 38.9 | 60.9 | 55.6 | 5.3 | 33.8 |
| 2.0 | 44.9 | 55.1 | 50.0 | 5.1 | 39.8 |
| 2.4 | 53.9 | 46.1 | 41.7 | 4.4 | 49.5 |

2. The volume of the cylinder has an upper limit. An engine with a piston diameter of 86 mm, a piston stroke of 86 mm, and a displacement of 499.6 cc is used as an example for the illustration. If the piston stroke is expanded by 2.4 times (n=2.4), the length of the cylinder (single-cylinder) of the internal combustion engine system of the present invention is the same as that of the conventional internal combustion engine system, but the width will be increased by 120.4 mm, and the height will be increased by 653.2 mm. If a multi-cylinder design is adopted, the total volume of the cylinders of the internal combustion engine system of the present invention will become very large and have difficulty to be placed in an engine chamber of a small motor vehicle. In addition, the link block (51) of the present invention will have a width up to 86 mm (or a diameter of the upper piston) if n=2.4. Even if the length of the lower link rod (60) is increased accordingly, the width/length ratio of the lower link rod (60) will not affect the load capacity after the torque become larger.

3. Based on the consideration of a significant power saving effect, the innovation of an engine of a piston vehicle generally uses a single-system design (instead of combining a plurality of systems such as a gasoline-electricity hybrid system), so that the power saving efficiency of the internal combustion engine can reach up to approximately 20%. Therefore, the internal combustion engine system of the present invention uses this value as the lower limit for the power saving efficiency, and the stroke (or torque) expansion multiple n should have a lower limit of 1.5 according to the data listed in the table above.

In summation, the reasonable range of the multiple of the engine stroke (or torque) expansion n falls within a range of 1.5~2.4.

Figure 8:
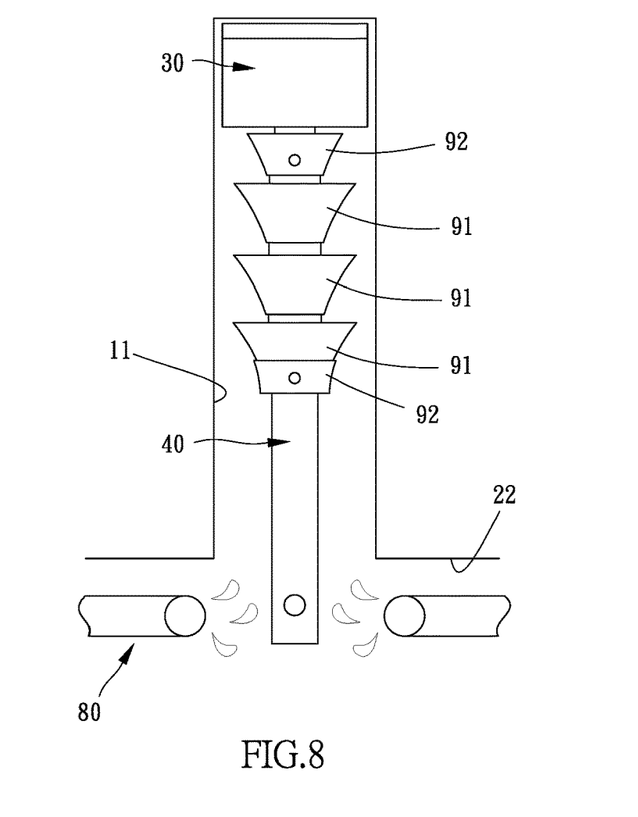
FIG. 8 is a perspective view of an oil collection cup and an oil cup holder of a preferred embodiment of the present invention.
Figure 9:
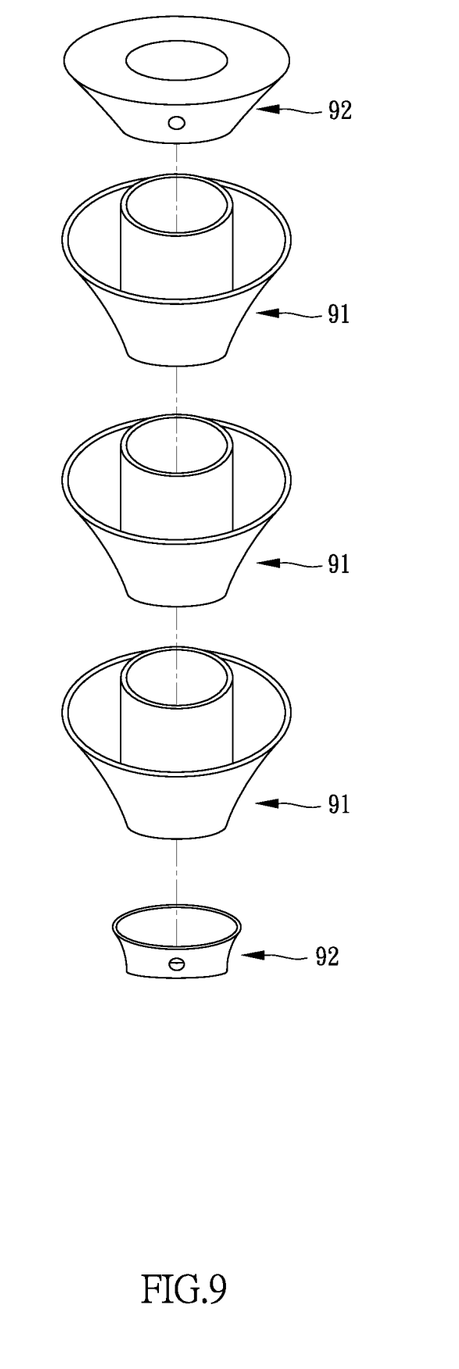
FIG. 9 is an exploded view of an oil collection cup and an oil cup holder of a preferred embodiment of the present invention.

The aforementioned oil ring (80) is communicated with the original oil pump of a motor vehicle and further comprises a plurality of oil collection cup (91) and oil cup holders (92) installed at the upper link rod (40) as shown in FIGS. 8 and 9, and there are two oil cup holders (92) disposed at the top and bottom respectively and having the same shape or different shapes with respect to each other. The oil collection cup (91) has an upward and tapered opening, and the upper and lower arrangements of the oil collection cups (91) are limited by the positions of the upper and lower oil cup holders (92), so that when the upper link rod (40) is moved up and down, oil will be sprayed from the oil outlet (82) of the oil ring (80) to the oil collection cup (91), and when the upper piston (30) moves upward and approaches an upper dead point, and then moves downward, the oil contained in the oil collection cup (91) will be sprayed onto the bore wall of the upper piston bore (11) by inertia and a squeezing effect, so as to complete the lubrication of the upper piston bore (11) and achieves the effects of substituting the conventional oil spraying system, and providing better lubrication.

In the aforementioned embodiment, the oil collection cup (91) and the oil cup holder (92) can also be integrally formed with the upper link rod (40) to achieve the effect of lubricating the upper piston bore (11).

Figure 10:
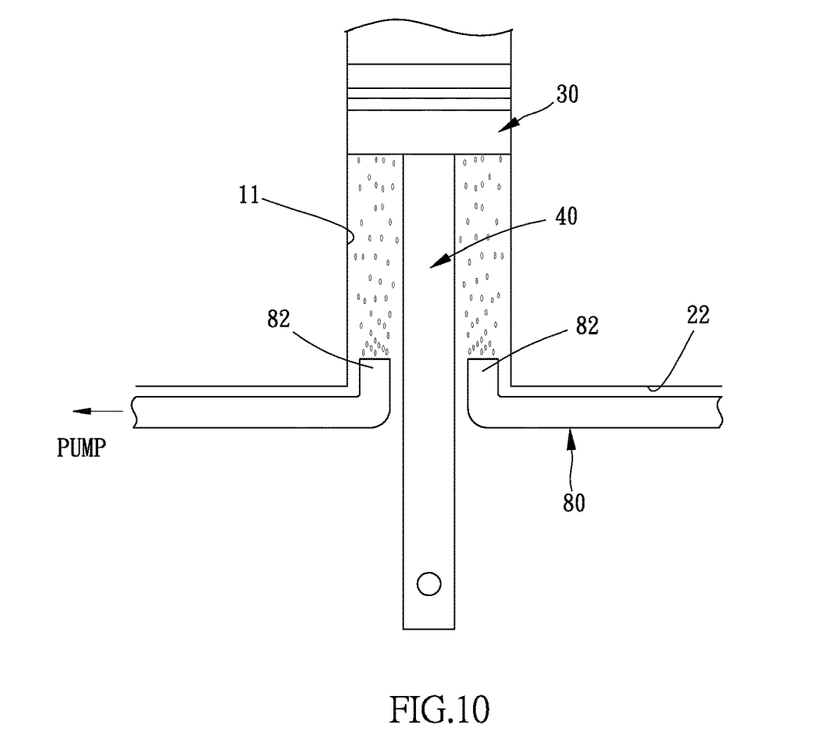
FIG. 10 is a perspective view of an upper part of another preferred embodiment of the present invention.
Figure 11:
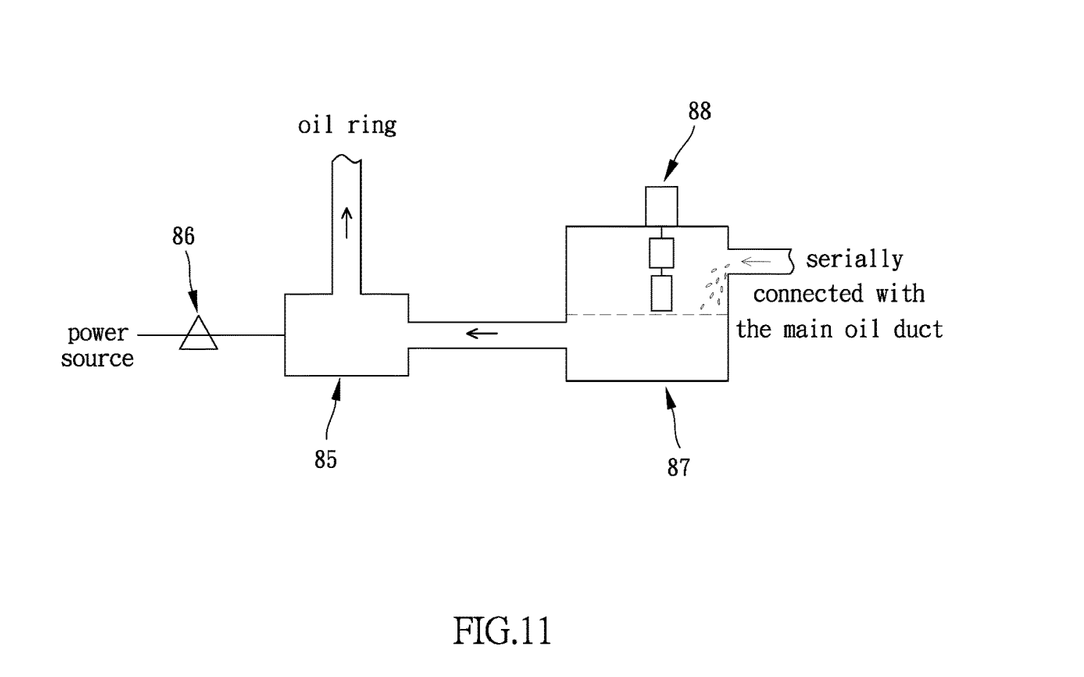
FIG. 11 is a perspective view of a pump and a temporary oil storage tank of another preferred embodiment of the present invention.

With reference to FIGS. 10 and 11 for another embodiment of the oil ring (80) of the present invention, the oil ring (80) has a plurality of oil outlets (82) configured upwardly to be corresponsive to the upper piston bore (11), and the oil outlet (82) is formed by a nozzle. The oil ring (80) further comprises a pump (85) communicated with the oil ring (80); a control circuit (86) coupled to pump (85) via a signal; and a temporary oil storage tank (87) communicated with the pump (85); a temporary oil storage tank (87) serially coupled to a main oil duct, and having a level sensor (88) linked with the control circuit (86) for turning on/off the level sensor (88). By the force applied by the pump (85), a sufficient pushing force can be produced to inject the oil upwardly to a bore wall of the upper piston bore (11), so as to further control the lubrication.

In addition, the cylinder (1) is formed by combining an upper cylinder (10) and a lower cylinder (20) to facilitate the manufacturing and assembling processes. The upper piston bore (11) is disposed at the upper cylinder (10), and the lower piston bore (21) is disposed at the lower cylinder (20).

Figure 6:
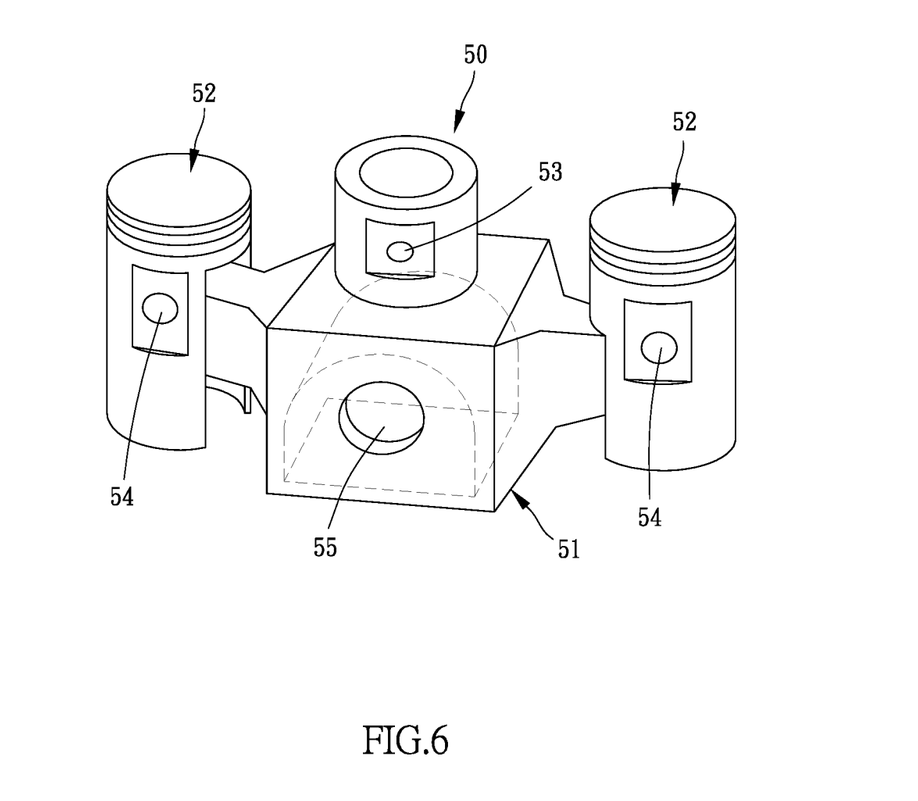
FIG. 6 is a perspective view of a linkage unit of a preferred embodiment of the present invention.
Figure 7:
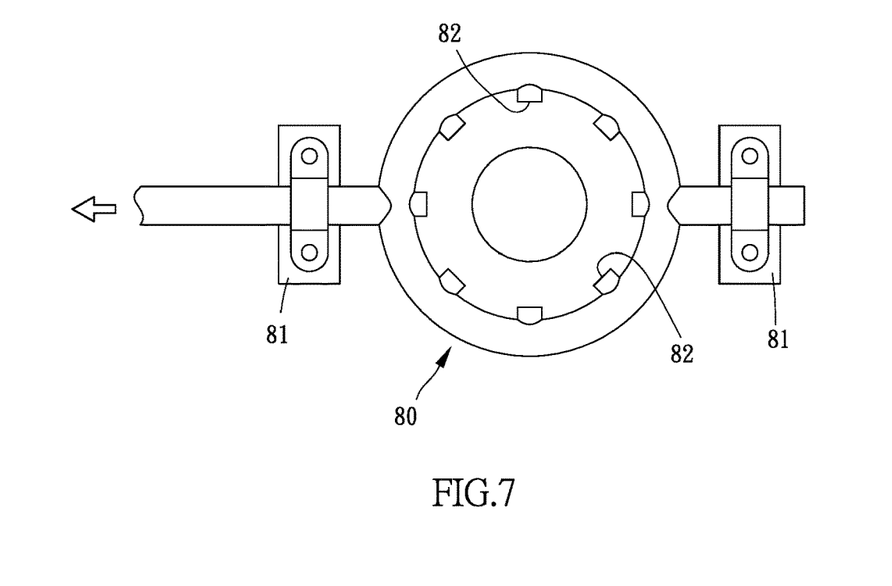
FIG. 7 is a schematic view of an oil ring of a preferred embodiment of the present invention.

Further, the link block (51) comprises an upper link rod connecting portion (53) coupled to the upper link rod (40), a lower piston connecting portion (54) pivotally coupled to the lower piston (52), and a lower link rod pivoting portion (55) pivotally coupled to lower link rod (60), so as to provide a better linkage effect.

Figure 4:
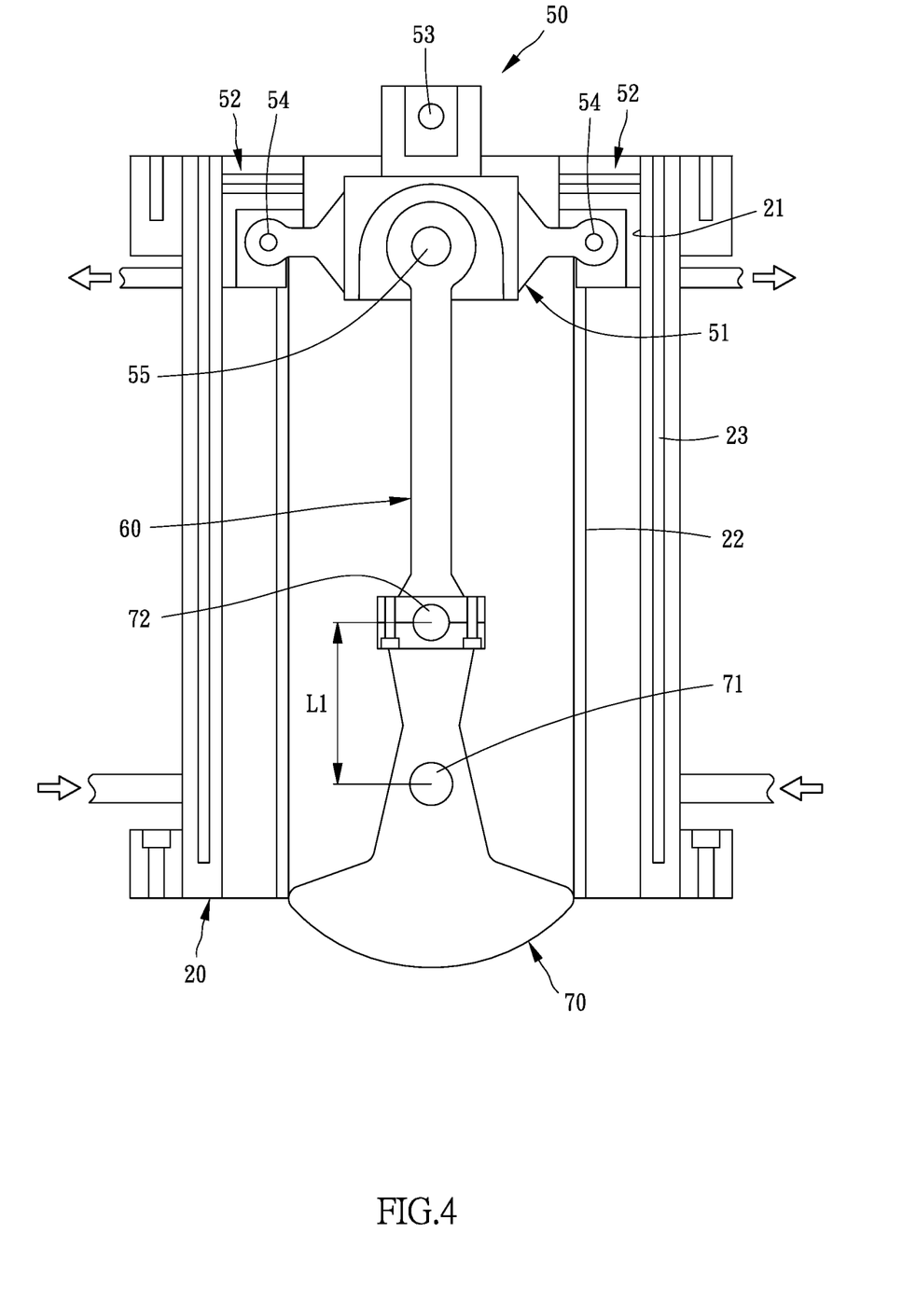
FIG. 4 is a perspective view of a lower part of a preferred embodiment of the present invention.
Figure 5:
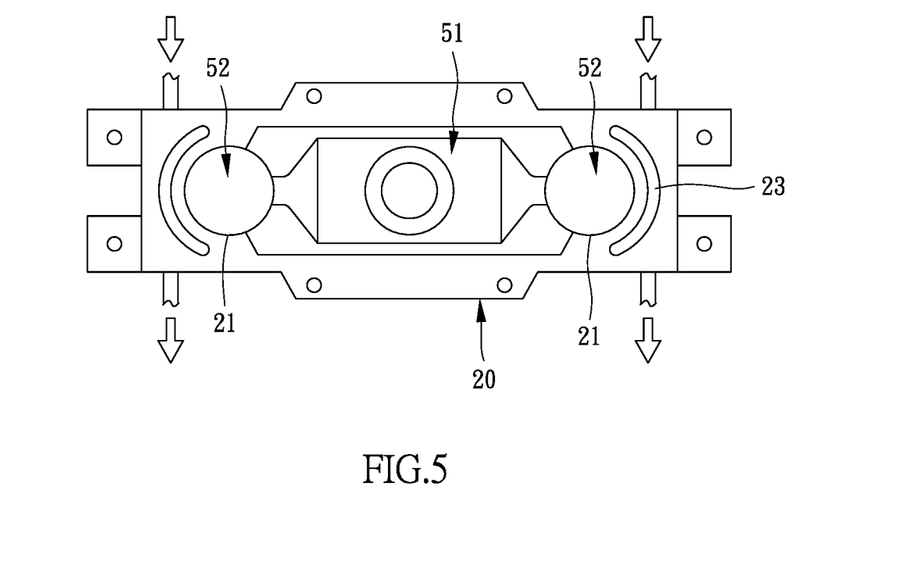
FIG. 5 is a bottom view of FIG. 2.

There are two lower piston bore (21) of the lower cylinder (20) disposed on two opposite sides respectively and communicated with the lower action chamber (22), and the linkage unit (50) has two lower pistons (52) cooperating with the two lower piston bores (21) respectively, and the lower action chamber (22) is communicated with the upper piston bore (11). The two lower pistons (52) are disposed on two opposite sides to provide a smooth balanced operation.

The lower piston connecting portion (54) is pivotally coupled to the lower piston (52), and the link block (51) is fixed to the lower piston (52); or the link block (51) and the lower piston (52) are integrally formed. However, the invention is not limited to such arrangement only.

Figure 2:
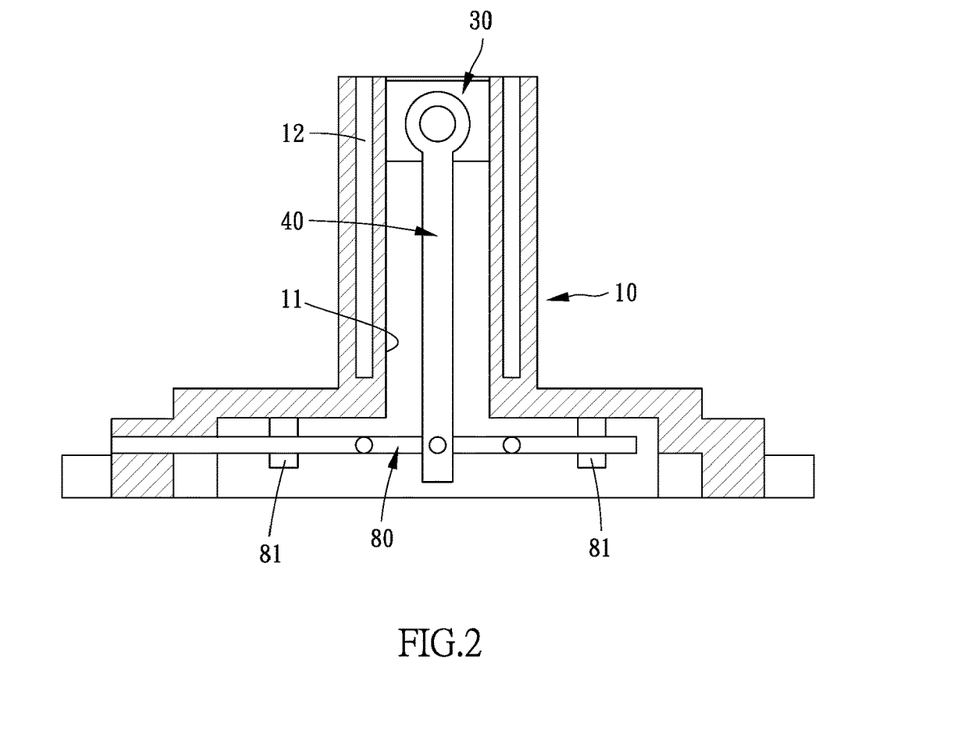
FIG. 2 is a perspective view of an upper part of a preferred embodiment of the present invention.
Figure 3:
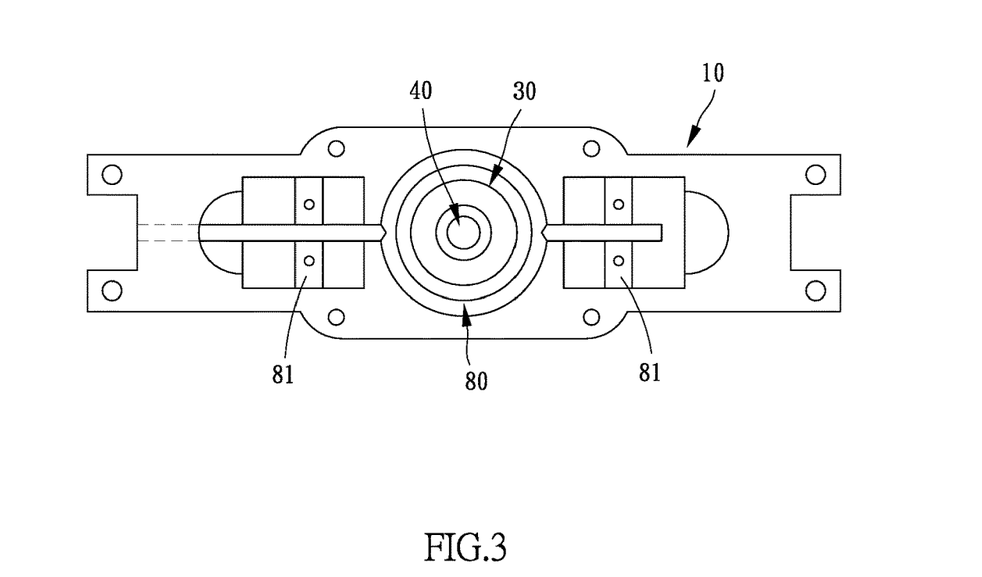
FIG. 3 is a bottom view of FIG. 2.

In FIGS. 2 and 3, the upper cylinder (10) and the lower cylinder (20) are installed at the upper water-cooling channel (12) and the lower water-cooling channel (23) respectively to serve as a cooling device. When the internal combustion engine adopts an air-cool design, a plurality of fins installed to the exterior of the upper cylinder (10) and the lower cylinder (20) can be used to substitute the upper water-cooling channel (12) and the lower water-cooling channel (23) and serve as the cooling device.

In summation of the description above, the expanded torque system of an internal combustion engine of the present invention uses the components including the lower cylinder (20), the linkage unit (50), and the lower link rod (60) to increase the length of the lower link rod (60) in order to increase the arm of force for the rotation of the crank shaft (70) while maintaining the diameter of the upper piston (30) unchanged. The invention not just increases the horsepower and torque outputted by the internal combustion engine system or maintains the original horsepower to achieve the effect of saving power only, but also can overcome the drawback of the conventional internal combustion engine system having insufficient intake air due to the increased SB ratio. In addition, the expanded torque system of an internal combustion engine of the present invention uses the lubrication system of the upper cylinder (10) comprised of the oil ring (80) and the oil collection cup (91) and the installation of the link block (51) and the lower piston (52) to overcome the problems of the conventional internal combustion engine system having insufficient lubrication of the cylinder caused by the increased S/B ratio and the width/length ratio of the link rod and unable to withstand a large torque. The invention can provide a long-term smooth and stable operation of the internal combustion engine.

What is claimed is:

1. An expanded torque system of an internal combustion engine, comprising:
    a cylinder (1) having an upper piston bore (11), a lower piston bore (21) and a lower action chamber (22);
    an upper piston (30) reciprocally moving in the upper piston bore (11);
    an upper link rod (40) with one of two ends coupled to the upper piston (30);
    a linkage unit (50) comprising a link block (51) coupled to another one of the two ends of the upper link rod (40), and a lower piston (52) moving in the lower piston bore (21) and coupled to the link block (51);
    a lower link rod (60) disposed at the lower action chamber (22) and having one of two ends pivotally coupled to the linkage unit (50);
    a crank shaft (70) disposed at the lower action chamber (22), the crank shaft (70) comprising a main shaft (71) and a lower link rod pivoting handle (72) eccentrically coupled to the main shaft (71), and another one of the two ends of the lower link rod (60) being pivotally coupled to the lower link rod pivoting handle (72), and
    an oil ring (80) disposed at the top of the lower action chamber (22) and communicating with a main oil duct, and surrounding the upper link rod (40), the oil ring (80) having a plurality of oil outlets (82).

2. The expanded torque system of an internal combustion engine as claimed in claim 1, wherein the cylinder (1) comprises an upper cylinder (10) and a lower cylinder (20) combined with each other, the upper piston bore (11) is disposed at the upper cylinder (10), the lower piston bore (21) is disposed at the lower cylinder (20).

3. The expanded torque system of an internal combustion engine as claimed in claim 1, wherein the two lower piston bores (21) of the lower cylinder (20) are disposed on two opposite sides respectively and communicated with the lower action chamber (22), the linkage unit (50) has two lower pistons (52) cooperating with the two lower piston bores (21) respectively, the lower action chamber (22) communicates with the upper piston bore (11).

4. The expanded torque system of an internal combustion engine as claimed in claim 1, wherein the link block (51) comprises an upper link rod connecting portion (53) coupled to the upper link rod (40), a lower piston connecting portion (54) pivotally coupled to the lower piston (52), and a lower link rod pivoting portion (55) pivotally coupled to the lower link rod (60).

5. The expanded torque system of an internal combustion engine as claimed in claim 1, further comprising an oil collection cup (91) and an oil cup holder (92) installed to the upper link rod (40).

6. An expanded torque system of an internal combustion engine, comprising:
    a cylinder (1), having an upper piston bore (11), a lower piston bore (21) and a lower action chamber (22);
    an upper piston (30) reciprocally moving in the upper piston bore (11);
    an upper link rod (40) with one of two ends coupled to the upper piston (30);
    a linkage unit (50) comprising a link block (51) coupled to another one of the two ends of the upper link rod (40), and a lower piston (52) moving in the lower piston bore (21) and coupled to the link block (51);
    a lower link rod (60) disposed at the lower action chamber (22) and having one of two ends pivotally coupled to the linkage unit (50);
    a crank shaft (70) disposed at the lower action chamber (22) and comprising a main shaft (71) and a lower link rod pivoting handle (72) eccentrically coupled to the main shaft (71), another one of the two ends of the lower link rod (60) being pivotally coupled to the lower link rod pivoting handle (72);
    an oil ring (80) disposed at the top of the lower action chamber (22) and surrounding the upper link rod (40), the oil ring (80) having a plurality of oil outlets (82);
    a pump (85) communicating with the oil ring (80);
    a control circuit (86) coupled to the pump (85) via a signal, and a temporary oil storage tank (87) communicating with the pump (85), and serially coupled to a main oil duct, the temporary oil storage tank (87)

having a level sensor (88) linked with the control circuit (86) and turned on/off by the control circuit (86).

7. The expanded torque system of an internal combustion engine as claimed in claim 6, wherein the cylinder (1) comprises an upper cylinder (10) and a lower cylinder (20) combined with each other, the upper piston bore (11) is disposed at the upper cylinder (10), the lower piston bore (21) is disposed at the lower cylinder (20).

8. The expanded torque system of an internal combustion engine as claimed in claim 6, wherein the two lower piston bores (21) of the lower cylinder (20) are disposed on two opposite sides respectively and communicating with the lower action chamber (22), the linkage unit (50) has two lower pistons (52) cooperating with the two lower piston bores (21) respectively, the lower action chamber (22) communicating with the upper piston bore (11).

9. The expanded torque system of an internal combustion engine as claimed in claim 6, wherein the link block (51) comprises an upper link rod connecting portion (53) coupled to the upper link rod (40), a lower piston connecting portion (54) is pivotally coupled to the lower piston (52), a lower link rod pivoting portion (55) is pivotally coupled to the lower link rod (60).

\* \* \* \* \*